United States Patent [19]

Palmo et al.

[11] Patent Number: 5,189,932

[45] Date of Patent: Mar. 2, 1993

[54] ROCK BIT MANUFACTURING METHOD

[75] Inventors: Daura Palmo, Harris County; James H. Snider, Galveston County, both of Tex.

[73] Assignee: Cummins Tool Co., Tex.

[21] Appl. No.: 812,748

[22] Filed: Dec. 24, 1991

[51] Int. Cl.$^5$ ............................................. E21B 10/08
[52] U.S. Cl. ................................... 76/108.2; 29/466; 82/1.11
[58] Field of Search ................. 76/108.1, 108.2, 108.4, 76/101.1; 29/464, 466, 467; 82/1.11; 219/121.11, 121.12, 121.13

[56] References Cited

U.S. PATENT DOCUMENTS

| | | |
|---|---|---|
| 4,158,973 | 6/1979 | Schumacher, Jr. et al. |
| 4,187,743 | 2/1980 | Thomas |
| 4,276,946 | 7/1981 | Millsapps, Jr. |
| 4,711,143 | 12/1987 | Loukanis et al. |

Primary Examiner—Roscoe V. Parker
Attorney, Agent, or Firm—Browning, Bushman, Anderson & Brookhart

[57] ABSTRACT

The method of making a roller cone rock bit wherein a main body having a tool joint adjacent one end and a plurality of leg stubs adjacent the other end, has the outer surfaces of those leg stubs on a common conical locus tapering longitudinally inwardly from the radially outer extremity to the radially inner extremity. A like number of cone bases have their trunnions emplaced in respective recesses in a common fixture, in which the recesses are oriented with respect to one another in the same manner as is desired for the relative orientation of the trunnions on the finished rock bit. The end surfaces of the leg extensions which are integral with these trunnions are then simultaneously machined to lie on a common conical locus corresponding to that of the outer surfaces of the leg stubs. The trunnions are removed from the fixture, and each of the adjoining leg extensions has its machined end surface mated with an welded to a respective one of the outer surfaces of the leg stubs.

10 Claims, 2 Drawing Sheets

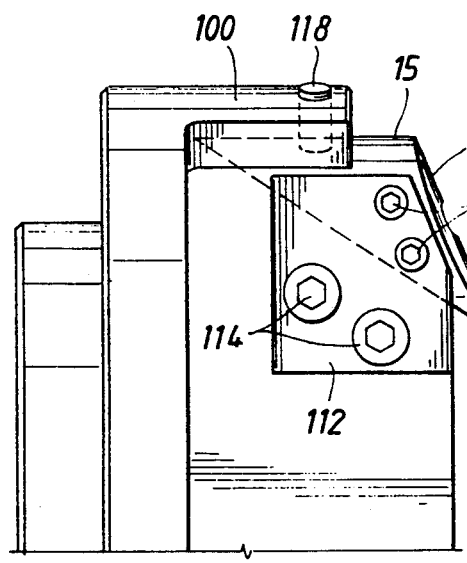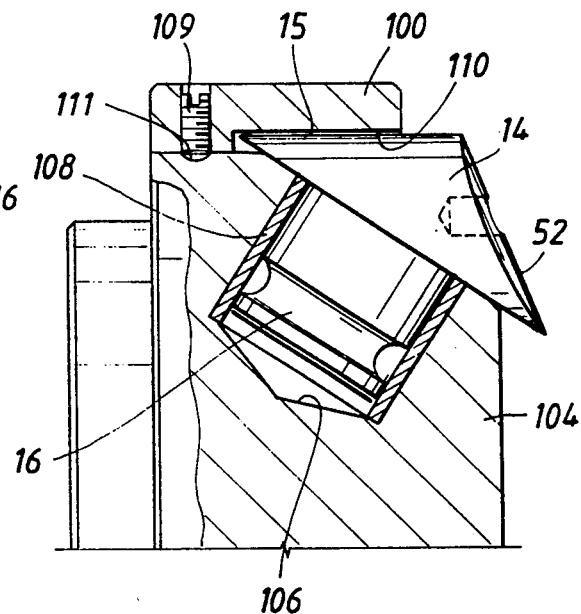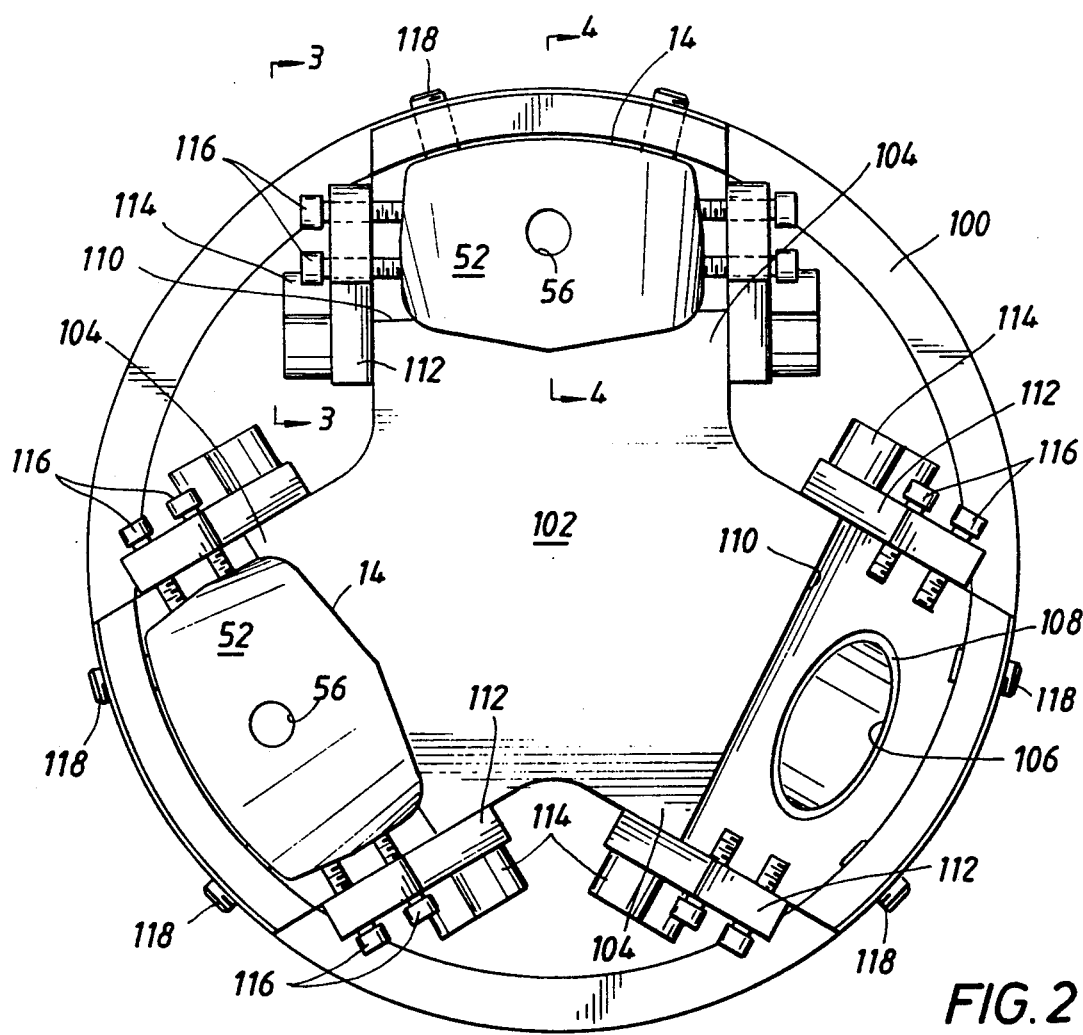

ROCK BIT MANUFACTURING METHOD

BACKGROUND OF THE INVENTION

The present invention pertains to the manufacture of roller cone-type rock bits generally in the manner described in U.S. Pat. No. 4,711,143. To facilitate understanding of the present disclosure, U.S. Pat. No. 4,711,143 is expressly incorporated herein by reference.

Briefly, the type of bit in question typically includes a body having a tool joint at one end for connecting the bit to the drill string. The other end is typically trifurcated, i.e. including three legs extending longitudinally generally in the opposite direction of the tool joint, radially displaced from the centerline of the bit, and circumferentially spaced from one another. At its outermost (lowermost in use) end, each leg has a trunnion extending angularly therefrom generally in a radially inward direction, and a respective roller cone is rotatably mounted on each of these trunnions. The number of legs, and thus the number of cones, can, of course, vary, but the vast majority of such rock bits include three legs and three cones.

Traditionally, probably the most common way of forming the main body of such a bit was to form three segments each extending the full length of the bit body, and each including a respective one of the legs as well as a one-third arcuate segment of the tool joint, and then to weld these segments together along joining lines extending generally longitudinally along the bit body. See U.S. Pat. No. 4,276,946 and U.S. Pat. No. 4,187,743 for examples of the forms of such segments.

There had been, however, other techniques in which a portion of the bit body including the tool joint and three stub-like portions of the legs would be formed, the remainders of the legs separately formed, and then joined to the stubs along generally horizontal lines. See U.S. Pat. No. 4,158,973.

Improvements over both of these prior methods were achieved by the technology described in the aforementioned U.S. Pat. No. 4,711,143. A main body member was provided, having a tool joint at one end and a plurality of leg portions or stubs at the other end. Such a body could be of new manufacture, or could be salvaged from a used bit. However, the outer surfaces of the leg stubs to which leg extensions would be welded were not straight horizontal, but were inclined longitudinally inwardly from their radially outer extremities to their inner extremities, preferably lying on a common conical locus. The end surfaces of the leg extensions which were welded to these outer surfaces of the leg stubs were correspondingly shaped.

SUMMARY OF THE INVENTION

The present invention provides for easier and more precise alignment and orientation of the various parts of a bit otherwise manufactured generally in accord with the method of U.S. Pat. No. 4,711,143. The end surfaces of the leg stubs are formed, preferably by simultaneously machining, with outer surfaces lying on a common locus defining a surface of revolution, such as a cone, which provides the aforementioned longitudinally inward inclination of those surfaces from their radially outer extremities to their radially inner extremities. A number of bases, corresponding to the number of such leg stubs, are formed. Each base comprises a leg extension defining an end surface and a trunnion extending angularly from the leg extension distal its end surface.

The end surfaces of a set of leg extensions destined to be used on a given bit are simultaneously machined to lie on a common surface of revolution corresponding to that of the outer surfaces of the leg stubs of the main body member of that bit. In doing this, the trunnions integral with those leg extensions are mounted in respective recesses of a common fixture. These recesses are oriented with respect to one another in a manner corresponding to the desired relative orientation of the trunnions, and thus their cones, on the bit which is being made. Thus, the trunnions, properly relatively oriented by the fixture, become reference surfaces with respect to which the end surfaces of the leg extensions are simultaneously machined.

Then, when the trunnions are removed from the fixture, and each of their end surfaces, respectively, is mated with the outer surface of one of the leg stubs, the same relative orientation of the trunnions, and thus their cones, will be maintained. Because these mating surfaces conform to an inclined surface of revolution, such as a cone, rather than a flat horizontal surface, it is relatively difficult to upset this relative orientation. In other words, whereas two flat horizontal surfaces could abut each other with the leg extension in any one of a number of relative positions with respect to the leg stub, in the case of conical surfaces, which not only have mating curvatures, but which have radii of curvature which vary from their radially inner to their radially outer extremities, there is one position in which the surfaces will truly mate or seat properly, and by using this mating position, the leg extensions are properly aligned with the leg stubs, whereby the proper relative positioning of the trunnions is maintained.

It is also important to note that it is a practical impossibility to mount successive trunnions in a recess in the fixture in precisely the same position. Thus, parts machined successively in that fixture will have slight variations in the relative orientations of their end surfaces with respect to their trunnions. In the present method, wherein three given trunnions whose end surfaces are simultaneously machined are used, as a set, on one and the same bit, problems associated with the inability to identically mount successive parts in a fixture are obviated.

Somewhat surprisingly, it has been found that the present method provides for such precise alignment and relative orientation of the parts of the bit that additional fixturing previously utilized to properly locate the leg extensions with respect to the leg stubs during welding has become largely redundant, and is now used more as a safeguard to ensure that the bit, as a whole, is of proper gauge, than to set up the proper relative orientation of the leg extensions with respect to one another and to the main body of the bit.

In preferred embodiments of the invention, the machining of the end surfaces of the leg extensions is performed with a known "live tool" type of maching apparatus and with respect to a positioning axis of that apparatus. Preferably, while the set of three trunnions is in the fixture, i.e. either before or after the aforementioned machining of the conical curvature of their end surfaces, that same live tool apparatus, utilizing the same positioning axis, is used to form bores in the end surfaces of the leg extensions. Once again, elimination of the need to mount a given trunnion in successive fixtures, i.e. use of the common positioning axis of the live tool apparatus along with a common fixture, eliminates inaccuracies in the relative positioning of these bores. Then, since small pins inserted in these bores as well as in aligned bores in the leg stubs are used to locate and retain the mated end surfaces and outer surfaces during welding, the precision of the orientation of the parts is even further improved.

Many objects, features and advantages of the present invention will be made apparent by the following detailed description, the drawings, and the claims.

BRIEF DESCRIPTION OF THE DRAWINGS

FIG. 2 is a top view of the fixture used for machining of the end surfaces of the leg extensions, with two of three leg extensions in place.

FIG. 3 is a detailed elevational view taken on the line 3—3 of FIG. 2.

FIG. 4 is a detailed cross-sectional view, with some parts in elevation, taken on the line 4—4 of FIG. 2.

DETAILED DESCRIPTION

Figure 1:
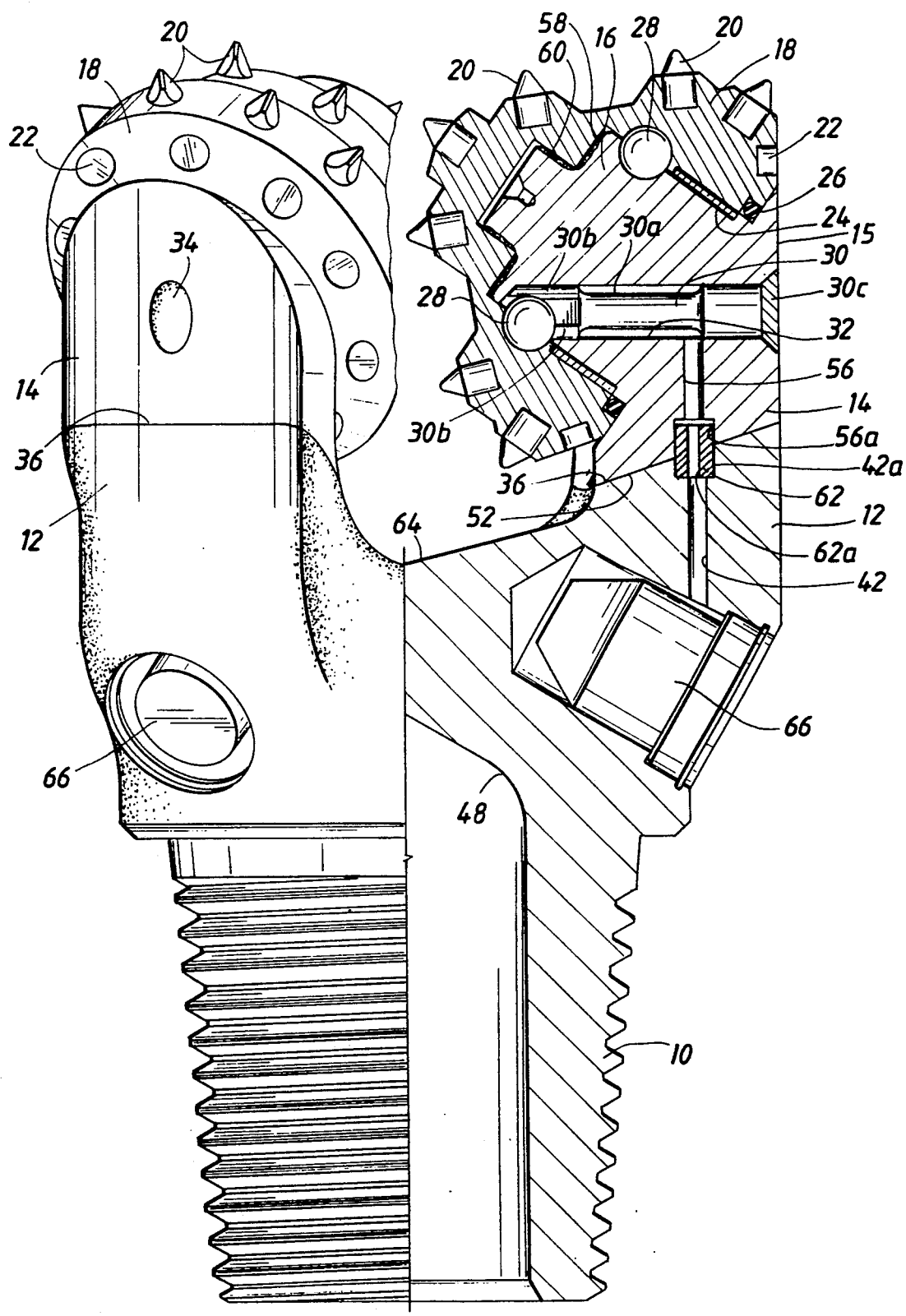
FIG. 1 is a longitudinal quarter-sectional view, with parts broken away, of a rock bit assembly of a type which may be formed in accord with the method of the present invention.

FIG. 1 illustrates a drill bit assembly made according to the method of the present invention. FIG. 1 may also be considered generally representative of the parts just prior to the welding step to be described hereinafter, except for a few features, such as the bore 62a, which is formed after welding, and the device 66, which is installed after welding. It will be understood that the bit is shown in a position it would most likely assume during the manufacturing process, but that its vertical orientation would be reversed in downhole use.

The bit assembly of FIG. 1 includes a bit body having an externally threaded pin connection 10 at one end. In the context of the method of this invention, a "tool joint" portion will refer to a finished connector such as 10, or to an area which may be further machined or treated to finish the connector. The bit body also includes three legs (only two of which are shown in FIG. 1) at the other end of the bit body, extending generally paralled to the bit centerline, but being radially offset from that centerline as well as circumferentially spaced from one another. Each of the bit legs has an inner portion or stub 12 and an outer extension 14. The leg portions 12, along with the pin 10 and the intermediate crown area 64 of the bit body comprise an integral main body member. This member may be salvaged from a used bit, or may be of new manufacture.

The outer portion 14 of each of the bit legs has an integral trunnion or journal member 16 extending angularly therefrom. Each leg extension 14 with its integral trunnion 16 will be jointly referred to as a "base" in this application.

A respective roller cone is mounted on each of the trunnions 16 for rotation with respect thereto. Each roller cone includes a cone body 18 of a suitable metal and a plurality of tungsten carbide inserts 20, mounted in the cone body 18 in the well known manner. The gauge area of each cone body 18 has wear inserts 22 mounted therein. Other types of cones, such as milled tooth cones, can also be used.

The interior of each cone body 18 and the exterior of its respective trunnion 16 have opposed cylindrical surfaces between which is mounted a journal bearing member 24. The interior of the cone body 18 has a counterbore located just outwardly of the bearing 24 and carrying an elastomeric O-ring type seal 26 which seals between the cone body 18 and the trunnion 16 at the wide end of the cone. Inwardly of the bearing 24, the trunnion 16 and cone body 18 are provided with opposed semi-circular ball races within which are disposed a plurality of balls 28. Although the balls 28 may take some bearing load, their primary function is to retain the cone body 18 on the trunnion 16. The assembly is held together by the balls 28, which in turn are retained by a pin 30 in a bore 32 through the base 14, 16. Pin 30, whose configuration and function will be described more fully hereinbelow, is retained by welding.

In manufacturing the main body member 10, 12, the outer surfaces 36 of the respective leg portions 12 are simultaneously machined, by well known techniques and available equipment, to lie on a common locus defining a surface of revolution, preferably a cone. Thus the surfaces 36 of the three leg portions 12 are concave, lie on a common conical locus coaxial with the centerline of the bit, and are inclined longitudinally inwardly from their radially outer extremities to their radially inner extremities.

Each of the leg portions 12 has a lubricant supply channel 42 extending generally lengthwise therethrough. Each lubricant supply channel 42 opens through the outer surface 36 of the respective leg portion 12. The end of each channel 42 opening through the respective surface 36 is counterbored, as shown at 42a.

As is conventional, the main body member 10, 12 has three mud openings (not shown) circumferentially spaced and interposed between the leg portions 12. The mud openings communicate via angular branch bores (not shown) with a large central bore 48 in the pin end of the member 10, 12. Each mud opening is adapted to receive a wear-resistant nozzle, and in use, drilling fluid is directed through bore 48 and the communicating branch bores and nozzles to cool the cones 18 and flush away rock cuttings.

The main body member 10, 12, as thus far described, is substantially ready for assembly with the other bit parts and welding.

Meanwhile, the cone assemblies will have been prepared as follows. The workpiece from which each base 14, 16 is formed may be somewhat longer than the finished base to allow a zone for engagement by a fixture or the like so that various features can be ground, machined, or otherwise formed. Thus, the outer configuration of the trunnion 16 is formed in any desired manner. Thereafter, the shirttail portion 15 is finished on a radius of curvature corresponding to the gauge of the bit, and the bore 32 is formed, extending into the shirttail portion 15 and communicating with the ball race.

Three bases whose trunnions 16 have been machined at angles appropriate for a given bit design are then placed in a common fixture shown in FIGS. 2-4. This fixture has a circular clamp ring 100 and a mounting block 102 having three radiating arms 104. The clamp ring 100 has three upstanding portions 101 and is secured about block 102 by set screws 109 riding in a circular groove 111 (see FIG. 4).

Each of the arms 104 has a recess 106 extending angularly thereinto from the upper surface. The angles and relative dispositions of the recesses 106 correspond to the desired relative orientation of the trunnions 16, and thus the cone assemblies carried thereby, in the finished bit. By loosening set screws 109 and rotating ring 100 until portions 101 are displaced from arms 104, each of the trunnions 16 of the three chosen bases can be placed in a respective one of the recesses 106, a sleeve 108 being interposed therebetween to provide for a good fit. Each of the fixture arms 104 has a cutaway portion 110 adjacent recess 106 for receipt of the leg 14 which is integral with the trunnion 16 disposed in the recess 106. Then ring 100 is rotated until portions 101 are aligned with arms 104, as shown, and set screws 109 are tightened.

It should be noted that FIG. 2 shows only two of the three bases in place in the fixture, so that the form of the recess 106 and adjacent parts of the fixture can be seen in the lower right-hand arm 104. However, the third trunnion would be installed in that recess in an actual manufacturing procedure. With the trunnions thus emplaced in the recesses 106, the end surfaces 52 of the leg extensions 14 all face generally outwardly, and more specifically upwardly, from the fixture.

Although each trunnion 16 has a fairly good fit in the sleeve 108 in its respective recess 106, it is nevertheless necessary to firmly fix the base 14, 16 for machining, and this is done by a series of screws inter-engaging between the fixturing and the leg extension 14, which is disposed outside the recess 106.

More specifically, a respective pair of ears 112 is affixed by screws 114 to the opposite sides of each fixture arm 104 so that they project along the sides of the cutaway portion 110. Additional screws 116 project through the ears 112 and are tightened until their ends firmly abut the opposite sides of the respective leg 14. This firmly locates the leg 14 and the attached trunnion 16 in a circumferential sense. In addition, each of the upstanding parts 101 has a pair of set screws 118 extending radially therethrough to abut the shirttail zone 15 of the leg 14 and thus urge the base 14, 16 firmly radially into abutment with the fixture.

It can be appreciated that, each time a respective base 14, 16 is emplaced in the fixture and firmly fixed with screws 116 and 118, there may be slight differences between its relative position with respect to the recess 106, and the like position of the next base so emplaced and fixed with respect to that recess. However, when three bases 14, 16, destined for use on the same bit, are emplaced in the fixture, and the end surfaces 52 of their leg extensions 14 are simultaneously machined, and later used as locating surfaces with respect to the main body member of the bit, the relative orientations of their trunnions 16, and thus the cones to be mounted thereon, will be maintained. This simultaneous machining is done using a known "live tool" apparatus having its own positioning axis for reference, and such that the end surfaces 52 all lie on a common conical locus corresponding in size and shape to that of the outer surfaces 36 of the stubs 12.

While the bases 14, 16 are in the fixture 100, either just before or just after the machining of the end surfaces 52, bores 56 are formed by the same live tool apparatus, and using the same positioning axis. Bores 56 are caused to intersect bore 32 as shown in FIG. 1. Thus, these two stages of machining, done while all three bases are on a common fixture, and by the same machine utilizing the same positioning axis, builds in further accuracy. The bore 56 is further counterbored, as shown at 56a in FIG. 1.

The three bases 14, 16 are then removed from the fixture and marked so that they will be used on one and the same bit. Thereafter, the cone assemblies are assembled. For example, seal ring 26 and bearing sleeve 24 may be pre-emplaced in the cone body 18 or about the trunnion 16, and then the cone body 18 is mounted on the trunnion 16. Balls 28 are loaded into their race through bore 32, pin 30 is installed in bore 32 to retain the balls in their race and welded in place at its flared outer end 30c.

It is noted that the portion of pin 30 which extends inwardly from the point of intersection of bore 32 and channel 56 is provided with clearance to allow lubricant to pass along pin 30 to the vicinity of the balls 28. In particular, the central portion of pin 30 has a reduced diameter area 30a. The inner end of pin 30 has lengthwise slots 30b extending to the reduced diameter area 30a. The extreme inner end of pin 30 has a curved configuration matching that of balls 28 so that it effectively forms a part of the ball race. Grease passing into the ball race can flow thence into the area of the radial bearing 24 as well as into the nose or small end of the cone body 18. The nose end of the trunnion 16 may include coatings 58 and 60 of a suitable metallic or other material to reduce friction and/or to provide auxiliary thrust and radial bearing area.

With the cone assemblies thus fully assembled, they are emplaced on the main body member 10, 12 for welding. A respective locating pin 62 is placed in each of the counterbores 42a. Then, each surface 52 of one of the cone assemblies is mated with a respective one of the surfaces 36, fitting the other end of locating pin 62 into counterbore 56a. A gauge ring may be placed about the three cone assemblies, and fine adjustments may be made by rotating one or more of the cone assemblies about its respective pin 62 to bring it into contact with the gauge ring, and thus, adjust the bit assembly as a whole to full and proper gauge.

As shown in FIG. 1, pin 62 is sized to leave a slight clearance, exaggerated in FIG. 1, at the of counterbore 56a so that pin 62 will not interfere with proper mating contact between surfaces 36 and 52.

With all parts assembled as shown in FIG. 1, the bit legs are formed by welding along mating surfaces 36 and 52. Preferably, the welding is done by energy beam welding, and even more particularly, by electron beam welding or laser welding. If, during this welding process, the beam is controlled and directed so as to follow the conical locus on which surfaces 36 and 52 lie, neither the beam itself, nor any material displaced thereby, will harm vulnerable parts of the bit assembly. In particular, because surfaces 36 and 52 are inclined longitudinally inwardly, i.e. toward pin 10, from the outer to the inner extremities of the bit legs, rather than being horizontal or oppositely inclined in the conventional manner, the electron beam and any metal carried thereby will bypass the cone assemblies and other vulnerable features, and instead will be "buried" in the center of crown 64.

After welding, bores 62a are drilled, and lubricant supply mechanisms 66 (which may be of any well known type) are installed. Other auxiliary parts of the completed bit, such as nozzle assemblies (not shown) may be installed either before or after the welding process, as desired and convenient.

Numerous modifications will suggest themselves to those of skill in the art and are within the spirit of the present invention. It is thus intended that the scope of the invention be limited only by the following claims. The order in which steps are recited in the following method claims is not to be construed in a limiting sense unless so indicated by terms such as "first," "then," "next," etc., or unless no other order is possible in practice.

What is claimed is:

1. A method of making a roller cone-type rock bit comprising the steps of:
   on a main body member having a tool joint portion adjacent one end and a plurality of leg portions adjacent the other end, radially offset from the centerline of the main body member and circumferentially spaced from one another, providing said leg portions with respective outer surfaces inclined longitudinally inwardly from the radially outer extremity to the radially inner extremity and lying on a common locus defining a surface of revolution;
   forming a plurality of bases corresponding to the number of leg portions, each base comprising a leg extension defining an end surface and a trunnion extending angularly from the leg extension distal its end surface;
   providing a fixture having a plurality of recesses corresponding to the number of trunnions, adapted to matingly receive respective ones of the trunnions, and oriented with respect to one another in a manner corresponding to a desired relative orientation of the trunnions on the rock bit;
   then mounting each trunnion in a respective one of the recesses of the fixture whereby the end surfaces of the respective leg extensions all face generally outwardly from the fixture;
   then simultaneously machining the end surfaces to lie on a common surface of revolution corresponding to that of the outer surfaces of the leg portions of the main body member;
   then removing the trunnions from the fixture;
   then mating each end surface of a leg extension with a respective outer surface of a leg portion of the main body member;
   then connecting the mated leg extensions and leg portions.

2. The method of claim 1 further comprising the step of rotatably mounting a roller cone on each trunnion after removing the trunnions from the fixture and before mating the end surfaces with the outer surfaces.

3. The method of claim 1 wherein the outer surfaces of the leg portions are formed to lie on a common conical locus, and the end surfaces of the leg extensions are so machined to lie on a corresponding common conical locus.

4. The method of claim 3 wherein the mated leg extensions and leg portions are so connected by welding.

5. The method of claim 4 wherein said welding is done by electron beam welding.

6. The method of claim 3 wherein said machining of the end surfaces is performed with an automated live tool apparatus utilizing a positioning axis.

7. The method of claim 6 further comprising the steps of:
   forming a bore in the outer surface of each leg portion:
   and, while the trunnions are in the recesses of the fixture, forming a respective bore in the end surface of each leg extension with said live tool apparatus and with respect to said positioning axis, the bore in the end surface being formed in a position to align with the bore of the respective outer surface when so mated to the end surface.

8. The method of claim 6 wherein said mating includes aligning the bores of each pair of mated surfaces, and emplacing a locating device in each such pair of aligned bores bridging the juncture of the mated surfaces.

9. The method of claim 8 further comprising counterboring each of said bores, and wherein each such locating device is so emplaced in the respective counterbores.

10. The method of claim 9 further comprising communicating a bearing on each trunnion with the bore in the respective end surface, and communicating a lubricant supply means with the bore in the respective outer surface.

* * * * *